United States Patent [19]

Leiber

[11] 4,285,199
[45] * Aug. 25, 1981

[54] HYDRAULIC BRAKE BOOSTER

[75] Inventor: Heinz Leiber, Leimen, Fed. Rep. of Germany

[73] Assignee: Robert Bosch GmbH, Stuttgart, Fed. Rep. of Germany

[*] Notice: The portion of the term of this patent subsequent to Apr. 15, 1997, has been disclaimed.

[21] Appl. No.: 961,809

[22] Filed: Nov. 17, 1978

[30] Foreign Application Priority Data

Dec. 1, 1977 [DE] Fed. Rep. of Germany ....... 2753585

[51] Int. Cl.³ .............................................. B60T 13/20
[52] U.S. Cl. ........................................ 60/550; 60/545; 60/581; 60/582; 91/391 A
[58] Field of Search ................. 60/550, 551, 535, 582, 60/581, 556, 545; 91/391 R, 509, 433, 434, 391 A

[56] References Cited

U.S. PATENT DOCUMENTS

| | | | |
|---|---|---|---|
| 3,918,765 | 11/1975 | Hayashida | 60/582 |
| 3,991,573 | 11/1976 | Harries | 60/550 |
| 4,015,881 | 4/1977 | Adachi | 60/551 |
| 4,055,957 | 11/1977 | Falk | 60/535 |
| 4,149,379 | 4/1979 | Shimizu | 60/582 |
| 4,197,710 | 4/1980 | Leiber | 60/581 |

FOREIGN PATENT DOCUMENTS 2411701 9/1975 Fed. Rep. of Germany ............ 60/551

Primary Examiner—Abraham Hershkovitz
Attorney, Agent, or Firm—Edwin E. Greigg

[57] ABSTRACT

The invention relates to a hydraulic brake booster for a vehicle brake apparatus which is provided with a pressurizing apparatus which has a pump and a reservoir. When the reservoir pressure fails, a switchover piston which is subject to the reservoir pressure can disengage a stop for the push rod of the control valve.

The push rod is supported on the stop when the pressure supply to the reservoir is intact and after the control valve switches over in the direction of brake activation, in order to give the driver a sense of the added brake force. In the same event, a support of a pedal activation stem on a movable auxiliary cylinder is removed. When the reservoir pressure supply fails, however, this support is made available, in order to enable an immediate mechanical actuation of the main cylinder portion of the brake booster.

18 Claims, 6 Drawing Figures

HYDRAULIC BRAKE BOOSTER

CROSS-REFERENCE TO RELATED APPLICATIONS

This application contains reference to a control device 66 also identified as an anti-wheel-lock final control device 66 and this has been described in my application Ser. No. 702,922 filed July 6, 1976 which is a parent application of Ser. No. 896,648 filed Apr. 17, 1978 in Group 315; the application is incorporated herein by reference.

BACKGROUND OF THE INVENTION

The invention relates to a hydraulic brake booster for a vehicle brake apparatus having a pressurizing apparatus with a pump and a pressurized reservoir and further including a reservoir switchover piston adapted to be subjected to the reservoir pressure and engagable with a control valve. In such a structure, the control valve is in proximity to a booster cylinder and arranged to control both a connection of the pressurizing apparatus with the booster cylinder and a connection of the booster cylinder with a relief means. A brake booster apparatus such as denoted above is already well-known.

In such brake boosters, the problem arises that when the supply of pressure medium is intact, only a small engaging stroke at the control valve is required, which is solely in order to switch over the control valve. However, when the supply of pressure medium fails, certain usually expensive expedients are necessary in order to uncouple the control valve from the booster piston, so that the mechanical drive of the pedal force which then must necessarily be transmitted through the main cylinder piston can be accomplished.

OBJECT AND SUMMARY OF THE INVENTION

The hydraulic brake booster of the present invention has the advantage over the latter that the control valve performs only one stroke required for its switchover, when the pressure medium supply is intact and the pistons of the main brake cylinder move ahead of the extent of the brake pedal actuation. When this supply fails, however, an overstroke which is required for the pedal actuation can be accomplished in a simple manner.

The invention will be better understood as well as further objects and advantages thereof become more apparent from the ensuing detailed description of preferred embodiments taken in conjunction with the drawings.

DESCRIPTION OF THE PREFERRED EMBODIMENTS

Figure 1:
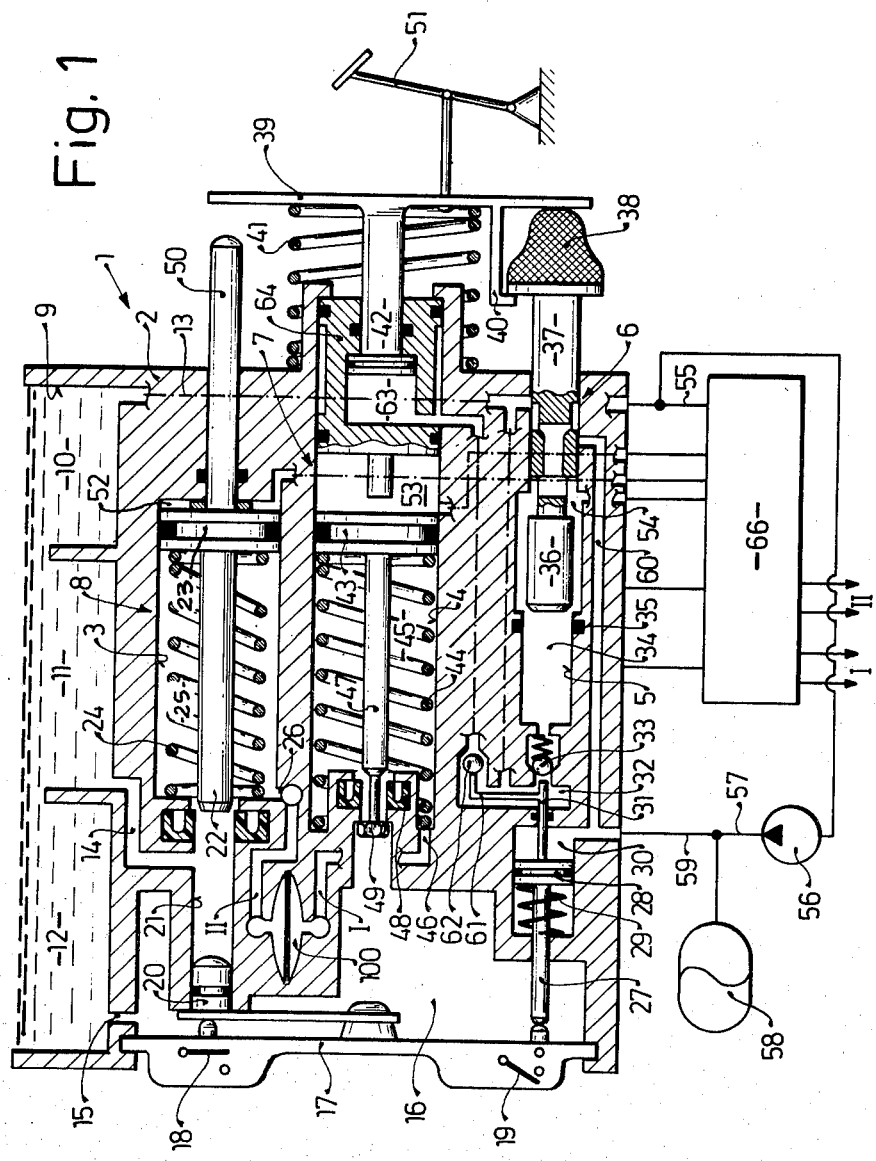
FIG. 1 shows partially in elevation and partially in cross section a first embodiment of the hydraulic brake booster.

A hydraulic brake booster 1 has a housing 2, in which three parallel bores 3, 4, 5, which are recessed at several points, are provided for a control valve 6 and two main cylinders 7 and 8. Seated on the housing 2 is a refill container 9 which has three chambers 10, 11 and 12. The liquid in chamber 10 is fed to the control valve 6 via a channel 13; the same liquid in chamber 11 communicates with the main cylinder 8 via a channel 14; and that in chamber 12 communicates via a channel 15 with a fluid filled zone 16 located on the left side of the brake booster 1 as viewed in the drawing, into which zone 16 all three bores 3, 4, 5 are arranged to discharge and, as also clearly shown, a cover cap 17 forms a closure for the end wall.

The cap 17 bears two switches 18 and 19 which are actuatable by pressure. The first switch 18 is located at the level of the main brake cylinder 8 and the second switch 19 is located at the level of the control valve 6. Switch 18 is actuated by a piston 20, which forms the end wall of a cylinder bore 21 to which the channel 14 is connected and into which an end portion 22 of a piston 23 of the main cylinder 8 can slidably extend in a sealed manner, for valving of passage 14 as shown. A return spring 24 for the piston 23 is arranged in an enlarged bore which will be denoted a "spring chamber 25" and this chamber in turn is connected to a brake circuit II via an outlet 26.

The switch 19 is actuated by the terminal end of a piston rod 27, which is connected with a reservoir-switchover piston 28. The switchover piston 28 is arranged coaxially relative to the control valve 6 in the bore 5 and is movable under reservoir pressure against the force of a spring 29. A reservoir pressure cylinder is indicated by reference numeral 30. The piston 28 has an elongated stem 31, which projects into a relief chamber 32, which can be connected on one side to the channel 13 and on the other side to a support cylinder 34 via a valve 33 which valve the stem 31 can push open. The stem 31 also includes a spur 61 which is adapted to operate the valve 62 which leads to the auxiliary cylinder 63, the latter being adapted to communicate with the main cylinder 7.

The support cylinder 34 is arranged coaxially relative to the control valve 6 and has a ring-type sealing means 35 arranged in an annular recess in the cylinder wall 5, into which sealing means a support piston 36 is arranged to slide. This support piston 36 is integrally connected with a slidable shaft 37 provided on the control valve 6, the other end of which projects out of the housing 2 and carries a travel-limiting spring 38.

The travel-limiting spring is stretched between the one end of a crossbar 39 and a coupler element 40 that is affixed on the crossbar.

The crossbar 39 is arranged to support at its center the auxiliary piston 42, which includes a movable wall within the auxiliary cylinder 63. This auxiliary cylinder 63 is arranged in a secondary piston 64, which is arranged coaxially to a piston 43 of the second main cylinder 7. The piston 43 is movable in the main cylinder 7 against the force of a spring 44 positioned in chamber 45. The spring chamber 45 is connected with a brake circuit I via an outlet 46 and is adapted to be penetrated by a piston rod 47, which can extend through an annular sealing means 48, with the headed end 49 of the rod 47 permitting fluid to pass into the zone 16 and back.

The crossbar 39 is supported opposite the housing 2 by a spring 41. The other end of the crossbar 39, as shown, opposes a rod extension 50 of the main cylinder piston 23, with axial clearance. The center of the crossbar 39 is provided with a link that is to be actuated by a pedal 51. Behind pistons 23 and 43 there are chambers 52 and 53, which either separately or together, via an anti-wheel lock final control device 66, are capable of being joined to a pressure exchange chamber 54 of the control valve 6.

An induction line 55 is connected to the channel 13 which communicates with the refill container chamber 10 and this induction line 55, as shown, leads to a pump 56 and to the final control device 66. A pressure line 57 exits this pump 56 and extends to a reservoir 58 and via a branch 59 into the reservoir pressure cylinder 30. The pump 56 and the reservoir 58 comprise a pressurizing apparatus 56/58 of the brake booster 1. The pressure line branch 59 is connected with the control valve 6 via a longitudinal channel 60. Between the two hydraulic circuits I and II, a hydraulic equalization device 100 may also be provided in the brake booster 1.

Mode of Operation

When the pedal 51 is activated, the crossbar 39 and the push rod 37 move toward the left as viewed in the drawing, until the control valve 6 has switched over. The pressure medium is directed into the chambers 52 and 53 by the pressurizing apparatus 56/58 and the two pistons 23 and 43 move farther to the left, moving ahead of the activation of the pedal 51. Both brake circuits I and II are supplied with pressure medium via the outlets 26 and 46 and the final control device 66. Braking occurs.

The push rod 37 slides in a sealed manner with its support piston 36 into the support cylinder 34 and is thereby arrested in its motion by the virtually incompressible medium. In a further motion of the pedal 51 then the travel-limiting spring 38 is compressed, and the driver is thereby given a sense of the effective braking force. The switch 18 measures the brake pressure, and the switch 19 detects the reservoir pressure.

If the reservoir pressure falls below a predetermined level, then a connection between the crossbar 39 and the two pistons 23 and 43 must be furnished; that is, the means capable of controlling the push rod 37 must be disengaged.

This is accomplished by means of the movement of the switchover piston 28 to the right in response to the force of the spring 29, so that its stem 31 pushes the valve 33 open. This breaks the seal of the support cylinder 34 and thus removes its motion-arresting capability and, as a consequence, its contents flow back toward the refill container 9. The result is that the push rod 37 can move farther into the housing 2.

When the valve 33 is pushed open, the spur 61 simultaneously closes the valve 62. Then the hydraulic charge of the auxiliary cylinder 63 comprises an incompressible support for the auxiliary piston 42. After the axial play shown is overcome, then a mechanical-hydraulic apparatus is created in the main cylinders 7 and 8 for through-control. The brakes are then actuated without boosting. The above apparatus may also be purely mechanical or purely hydraulic.

If a danger of wheel locking arises, then the final control device 66 effects a corresponding relief of the brake lines which lead to the wheels where locking is suspected.

Figure 2:
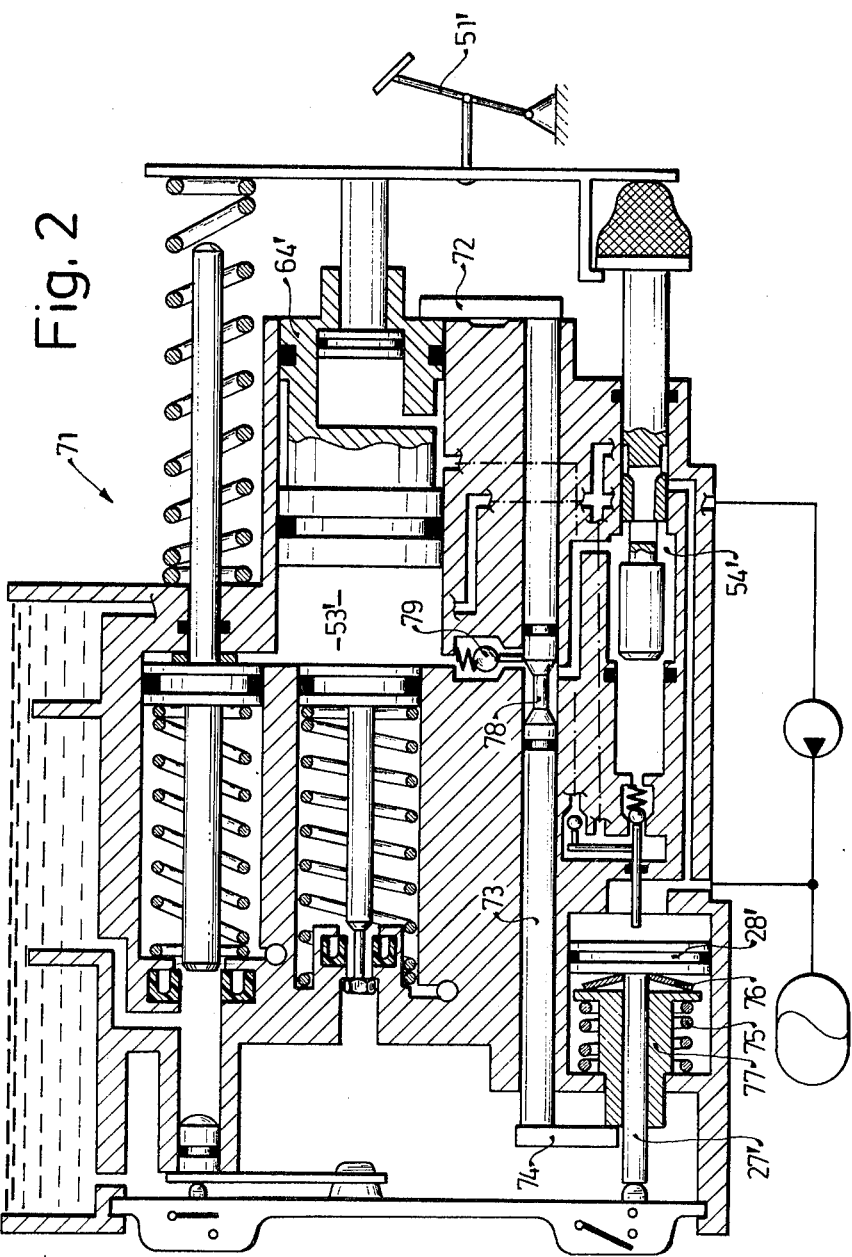
FIG. 2 shows a generally similar view of a further embodiment of the brake booster shown in FIG. 1 with a longer pedal path.

FIG. 2 shows a brake booster generally similar to that shown in FIG. 1, but equipped with an apparatus which extends the path of the brake pedal. Such a pedal path extension apparatus permits a longer stroke for the brake pedal when auxiliary force fails, in order to replace at least partially the missing auxiliary force. The same reference numerals are used for those parts which correspond to the structure of FIG. 1.

In this embodiment, a brake booster 71 has a secondary piston 64' which is adapted to contact the end of an arm 72 of the rod 73 which extends longitudinally and entirely through the booster housing. This rod 73 has a right angled arm 74 at its other end, which arm is adapted to contact one wall of a piston member 77. The piston member 77, it will be observed, has a pair of shoulders 77a and 77b, the first shoulder being arranged to abut the wall 71a and the other shoulder being adapted to support a spring 75. The reservoir switch-over piston 28' has a stem 27' that penetrates the piston member 77 and contacts the switch 19. A spring 76 is positioned between the spaced pistons 77 and 28' respectively. Thus in this manner the movements of the piston member 77 can be damped. The rod 73 includes a portion which resembles a spool member that forms a control area 78 for a valve means 79. The rod 73 also includes two O-ring seals which are disposed on opposite sides of the spool or control area 78 and thus control a connection between a chamber 53' and the pressure exchange chamber 54'. Accordingly, in view of the foregoing it is believed that it will be understood that if the pressurizing apparatus of this embodiment of the invention fails, then the rod 73 is displaced toward the right, and the brake pedal 51' is moved farther into the driver's compartment and that the brake pedal path is correspondingly lengthened. At the same time, the valve 79 closes the connection of the chamber 53' with the pressure exchange chamber 54', so that the fluid in chamber 53' becomes substantially incompressible.

Figure 3:
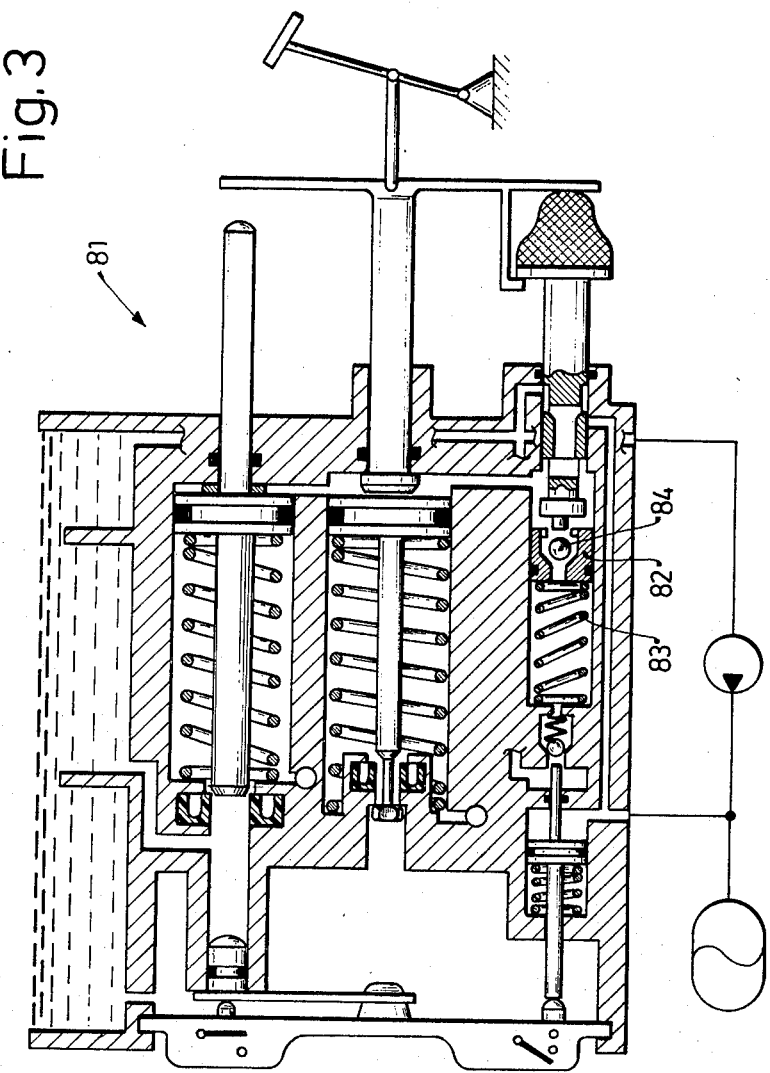
FIG. 3 shows another generally similar view of a further improvement in a stop means.

FIG. 3 shows a structure which differs only slightly from that shown in FIG. 1.

In this brake booster 81, and in contrast to the support piston 36 of FIG. 1 which is integrated with the slidable shaft 37, there is a separate piston 82 that is subjected to the force of a spring 83. The piston 82 is further combined with a ball-like valve element 84. This structure has the advantage that because of the greater piston surface area, the pressure in the incompressible space, when the pedal is fully actuated, is smaller than that in the structure according to FIG. 1. Because of the valve element 84, the demand placed on the piston sealing means is very limited.

Figure 4:
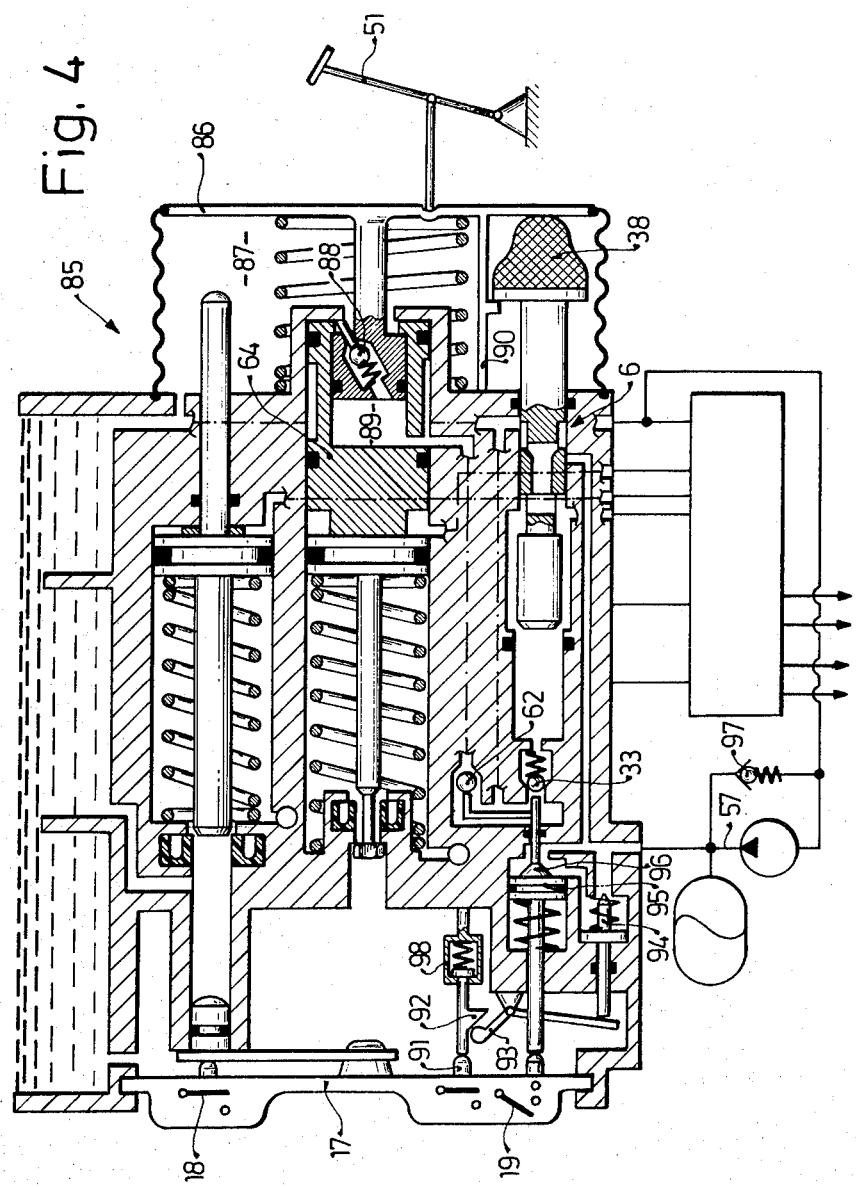
FIG. 4 shows a still further embodiment.

The further embodiment of this invention that is shown in FIG. 4 includes a brake booster 85 that has a crossbar 86, which is connected in fluid-tight fit with the booster housing. The chamber 87 thus formed is connected with an auxiliary cylinder 89 via a relief valve 88. The relief valve 88 serves to relieve the cylinder volume and to prevent underpressure at low ambient temperatures. A rod 90 is fixed at one end on the crossbar 86 and arranged to penetrate the booster housing and at its opposite end it is provided with an encapsulated spring member 98 adapted to actuate a stop-light switch 91. This switch 91 is arranged in a circuit together with the switches 18 and 19 which have already been described on the cover cap or closure 17.

The rod 90 has a cam 92 which cooperates with a lever 93 to close a valve 94, which is usually in the open position. Further, this structure has a reservoir pressure switchover piston 95 provided with a closing valve 96, and the pressure line 57 can be bypassed via an overpressure valve 97. The valves 33 and 62 are arranged to function in the same manner as described in connection with FIG. 1.

In this structure the valve 33 removes the locking operation of the control valve 6 when the supply of pressure medium fails.

The valve 62 serves to disengage the rubber travel-limiting spring 38 when the supply of the pressure medium fails. At the same time, it permits the direct coupling of the brake pedal 51 with the secondary piston 64. To this end the mode of operation of the two valves 33 and 62 should be such that 62 closes before 33 opens.

When there is a brief failure of the pressure medium supply during braking, the closing valve 96 is arranged such that should the pressure supply begin to function again in the interval, it will have no effect on the reservoir-switchover piston 95. Thus indeterminate states of operation of the brake booster, which appear when the pump is at partial capacity, are eliminated.

The valve 94 cooperates with the closing valve 96 in such a way that the pressure medium supply is first reconnected when the brake is released.

Figure 5:
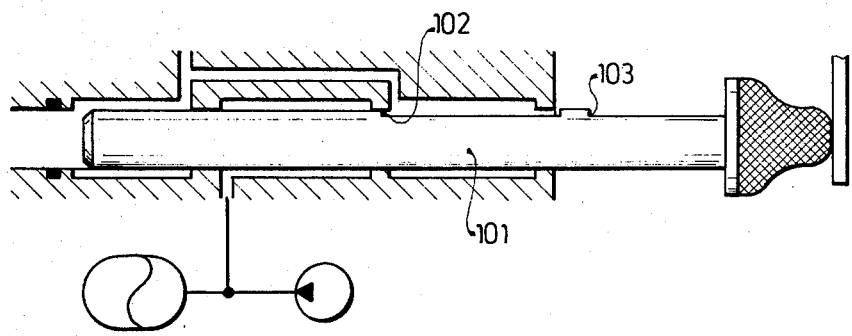
FIGS. 5 and 6 show another design of a detail of FIG. 4.
Figure 6:
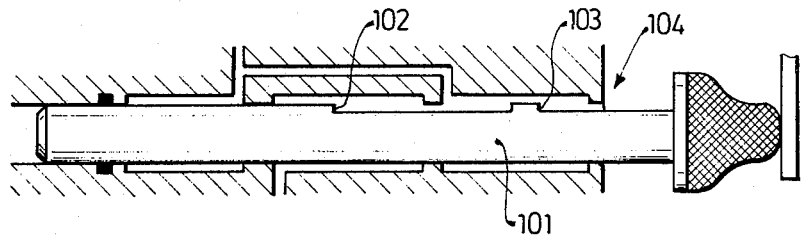

FIGS. 5 and 6 show that it is also conceivable to move the location of the valves 94 and 96 to a position directly on the slidable shaft or push rod 37. Such a slidable shaft 101 must then have two control edges 102 and 103, which take the place of the above-mentioned valves 94 and 96. Thus the control edge 103 provides a connection with a relief point 104.

If during a braking operation the defective energy supply should suddenly again be intact, then the pressure medium can flow directly to the relief point 104 via the control edge 103 (FIG. 6).

The foregoing relates to preferred embodiments of the invention, it being understood that other embodiments and variants thereof are possible within the spirit and scope of the invention, the latter being defined by the appended claims.

What is claimed and desired to be secured by Letters Patent of the United States is:

1. A hydraulic brake booster for a vehicle brake apparatus comprising pressurizing apparatus with a pump and a pressurized reservoir, a reservoir-switchover piston adapted to be subjected to the pressure in the pressurized reservoir and engagable with a control valve, said control valve being associated with a pair of hydraulic main cylinders and each having connection means adapted to control both said pressurizing apparatus connected with the said main cylinders and said main cylinders connected with a relief means, at least one of said main cylinders including piston cooperating means cooperating with pedal-operated means and said piston cooperating means adapted to be operated by said pedal-operated means on pressure failure, said piston cooperating means having at least one main cylinder including an auxiliary pressure means, said auxiliary pressure means including an auxiliary cylinder, piston means being coextensive with said at least one main cylinder, said pressurizing apparatus including a refill container comprising a container relief means, said auxiliary pressure means communicating with said container relief means through a valve means and said valve means being coupled with said reservoir switchover piston.

2. A hydraulic brake booster in accordance with claim 1, further wherein said means that cooperates with said at least one main cylinder includes a shaft that offstands from a piston disposed in said at least one main cylinder.

3. A hydraulic brake booster in accordance with claim 1, further wherein said main cylinders are associated with a pressure equalization apparatus.

4. A hydraulic brake booster in accordance with claim 1, further wherein said main cylinders are connected with an anti-wheel lock final control device to provide pressure modulation.

5. A hydraulic brake booster in accordance with claim 1, further wherein said auxiliary pressure means is associated with said reservoir-switchover piston through a pedal extension apparatus.

6. A hydraulic brake booster in accordance with claim 5, further wherein said pedal extension apparatus includes means for controlling a valve means, said valve means providing for communication between a chamber in close proximity to said auxiliary pressure means and a pressure exchange chamber.

7. A hydraulic brake booster in accordance with claim 1, further wherein said control valve includes a slidable shaft member and an independent piston means is arranged to cooperate with said slidable shaft member.

8. A hydraulic brake booster in accordance with claim 7, further wherein said independent piston means includes a valve member.

9. A hydraulic brake booster in accordance with claim 1, further wherein said at least one main cylinder is a coupler force booster.

10. A hydraulic brake booster in accordance with claim 1, further wherein said at least one main cylinder piston is arranged to operate a pressure detecting switch.

11. A hydraulic brake booster in accordance with claim 1, further wherein said brake booster includes a switch to control hydraulic pressure feed and detect when a minimum pressure level is not being attained.

12. A hydraulic brake booster in accordance with claim 1, further wherein said brake booster includes a housing and said housing is provided with a stop-light switch.

13. A hydraulic brake booster in accordance with claim 1, further wherein said brake booster includes a housing and said housing is provided with a cover cap adapted to support a series of switch elements.

14. A hydraulic brake booster in accordance with claim 1, further wherein said auxiliary pressure means includes a relief valve.

15. A hydraulic brake booster in accordance with claim 1, further wherein said brake booster includes a closing valve in axial alignment with said control valve and a further flow-modifying valve whereby an indeterminate state of operation of said brake booster is avoided.

16. A hydraulic brake booster in accordance with claim 15, further wherein said closing valve is affixed to the reservoir-switchover piston and said further valve is actuated by said brake pedal via a rod.

17. A hydraulic brake booster in accordance with claim 15, further wherein said closing valve and said further valve are defined by means associated with said slidable shaft.

18. A hydraulic brake booster in accordance with claim 1, further wherein said pressurizing apparatus for said brake booster includes a pressure line, said pressure being arranged to be bypassed by an overpressure valve.

* * * * *